(12) United States Patent
Lubbers et al.

(10) Patent No.: US 7,761,650 B2
(45) Date of Patent: Jul. 20, 2010

(54) PROCESSING WRONG SIDE I/O COMMANDS

(75) Inventors: Clark Edward Lubbers, Colorado Springs, CO (US); Michael Dean Walker, Colorado Springs, CO (US); James Francis McCarty, Trinity, FL (US)

(73) Assignee: Seagate Technology LLC, Scotts Valley, CA (US)

( * ) Notice: Subject to any disclaimer, the term of this patent is extended or adjusted under 35 U.S.C. 154(b) by 449 days.

(21) Appl. No.: 11/772,175

(22) Filed: Jun. 30, 2007

(65) Prior Publication Data
US 2009/0006716 A1 Jan. 1, 2009

(51) Int. Cl.
G06F 13/10 (2006.01)
(52) U.S. Cl. ..................................................... 711/100
(58) Field of Classification Search ........................ None
See application file for complete search history.

(56) References Cited

U.S. PATENT DOCUMENTS

| 7,028,297 | B2 | 4/2006 | Horn et al. | |
| 7,421,520 | B2* | 9/2008 | Wilkins et al. | 710/36 |
| 2003/0188233 | A1* | 10/2003 | Lubbers et al. | 714/100 |
| 2005/0091426 | A1* | 4/2005 | Horn et al. | 710/33 |
| 2006/0161733 | A1* | 7/2006 | Beckett et al. | 711/118 |

* cited by examiner

*Primary Examiner*—Tuan V Thai
*Assistant Examiner*—Duc T Doan
(74) *Attorney, Agent, or Firm*—McCarthy Law Group (57) ABSTRACT

A dual ported active-active array controller apparatus is provided having a first policy processor partnered with a first ISP having a first plurality of dedicated purpose FCs, a second policy processor partnered with a second ISP having a second plurality of dedicated purpose FCs, a communication bus interconnecting the ISPs, and programming instructions stored in memory and executed by the array controller to maintain the first policy processor in top level control of transaction requests from both the first plurality of FCs and the second plurality of FCs that are associated with network input/output (I/O) commands directed to a storage logical unit number (LUN) which the first ISP is a logical unit master of.

13 Claims, 9 Drawing Sheets

PROCESSING WRONG SIDE I/O COMMANDS

CROSS REFERENCE TO RELATED APPLICATIONS

This application is a continuation-in-part of copending application Ser. No. 11/144,468 filed on Jun. 2, 2005.

FIELD OF THE INVENTION

Embodiments of the present invention relate generally to the field of data storage systems and more particularly, but not by way of limitation, to the processing of data transactions in response to network I/O commands in a distributed array storage system.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity. What is needed is an intelligent data storage subsystem that self-deterministically allocates, manages, and protects its respective data storage capacity and presents that capacity as a virtual storage space to the network to accommodate global storage requirements. This virtual storage space is able to be provisioned into multiple storage volumes. It is to this solution that embodiments of the present invention are directed.

SUMMARY OF THE INVENTION

Embodiments of the present invention are generally directed to data transactions in a storage array.

In some embodiments a dual ported active-active array controller apparatus is provided having a first policy processor partnered with a first ISP having a first plurality of dedicated purpose FCs, a second policy processor partnered with a second ISP having a second plurality of dedicated purpose FCs, a communication bus interconnecting the ISPs, and programming instructions stored in memory and executed by the array controller to maintain the first policy processor in top level control of transaction requests from both the first plurality of FCs and the second plurality of FCs that are associated with network input/output (I/O) commands directed to a storage logical unit number (LUN) which the first ISP is a logical unit master of.

In some embodiments a method is provided with steps including employing a dual active-active controller having a first policy processor partnered with a first ISP having a first plurality of dedicated purpose FCs, and a second policy processor partnered with a second ISP having a second plurality of dedicated purpose FCs; receiving an I/O command by one of the FCs directed to a LUN on a non-unit-master side of the controller; and posting a transaction request command from the FC to the policy processor on the unit-master side of the controller.

In some embodiments a storage system is provided having a dual active-active array controller, each side having a plurality of dedicated purpose function controllers selectively coupled to a policy processor via a list manager communicating with a peripheral device bus to which the policy processor is connected, and means for synchronizing right side and wrong side I/O commands together in real time on a unit master side of the controller.

These and various other features and advantages which characterize the claimed invention will become apparent upon reading the following detailed description and upon reviewing the associated drawings.

DETAILED DESCRIPTION

Figure 1:
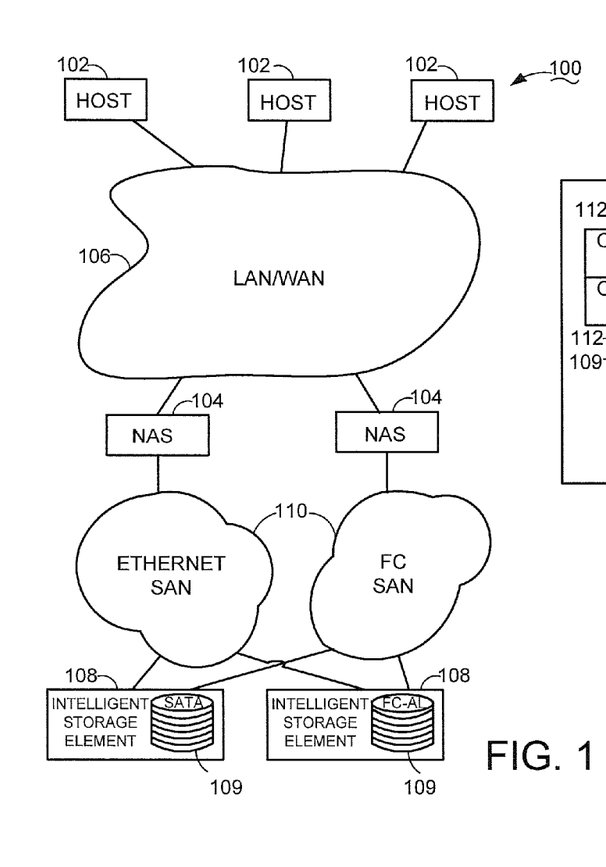
FIG. 1 is a diagrammatic representation of a computer system constructed in accordance with embodiments of the present invention.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements (ISE) 108. Accordingly, SANs 110 connect the servers 104 to the ISEs 108 for access to the stored data. The ISEs 108 provide a data storage capacity 109 for storing the data over various selected communication protocols such as serial ATA and fibre-channel, with enterprise or desktop class storage medium within.

Figure 2:
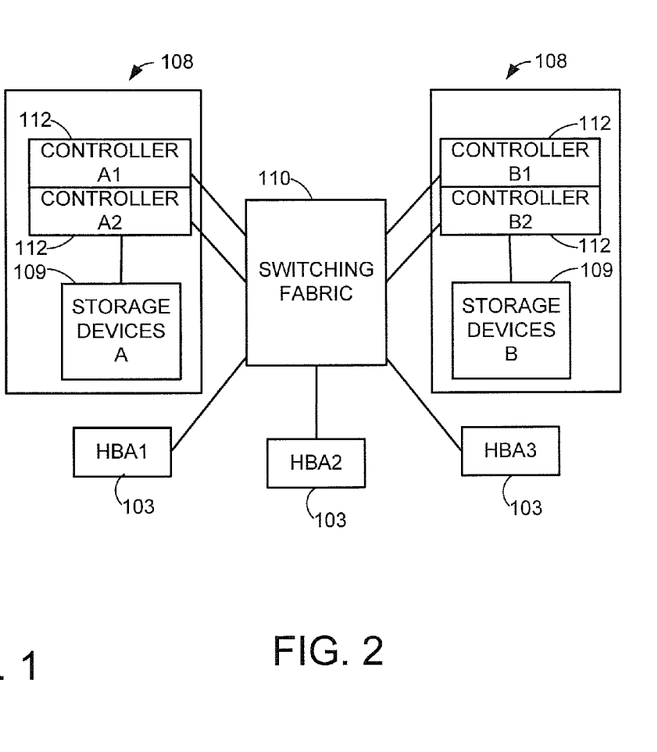
FIG. 2 is a simplified diagrammatic representation of a portion of the computer system of FIG. 1.

FIG. 2 is a simplified diagrammatic view of part of the computer system 100 of FIG. 1. Three host bus adapters (HBA) 103 are depicted interacting with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). That is, the controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

Figure 3:
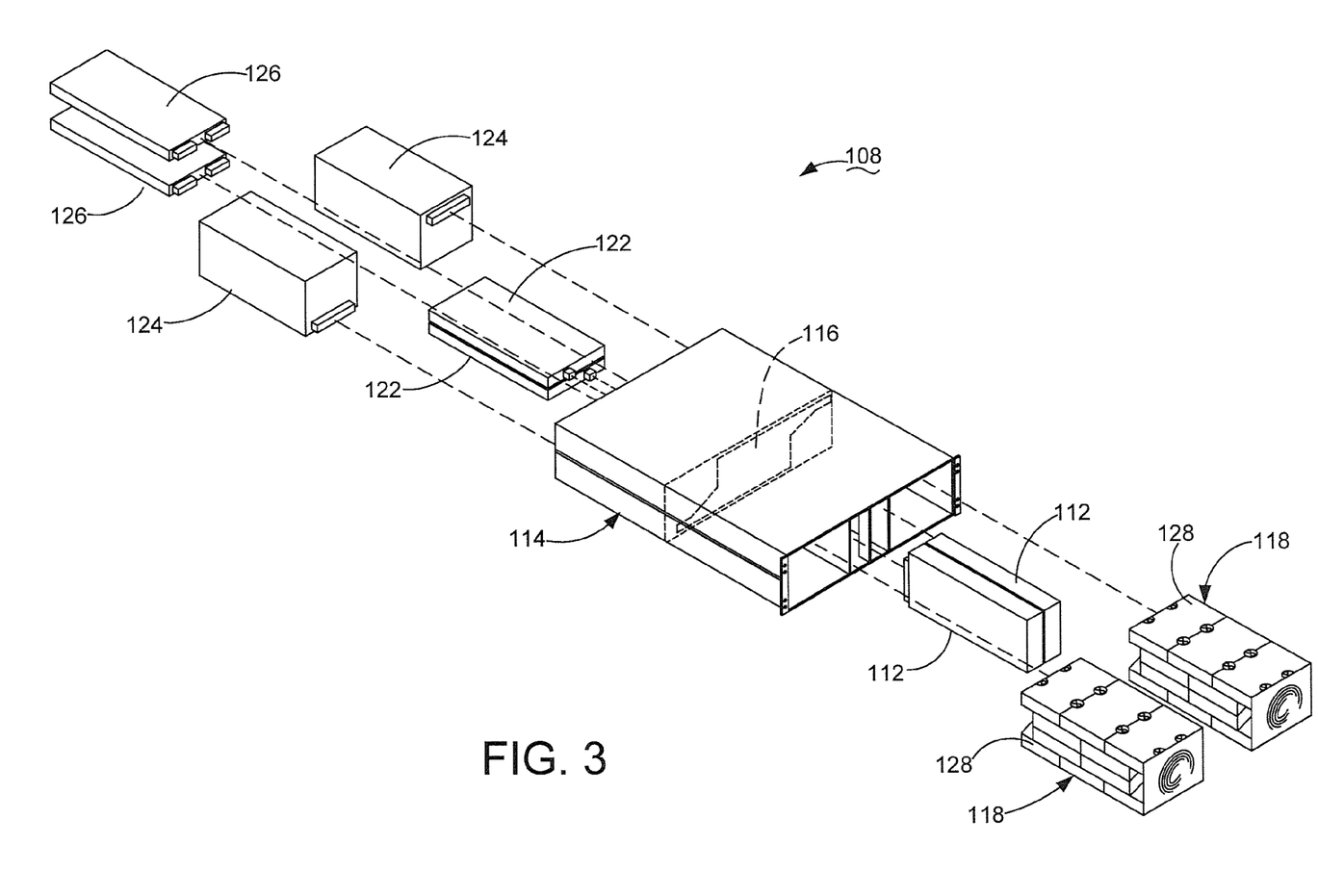
FIG. 3 is an exploded isometric view of an intelligent storage element constructed in accordance with embodiments of the present invention.

FIG. 3 illustrates an ISE 108 constructed in accordance with illustrative embodiments of the present invention. A shelf 114 defines cavities for receivingly engaging the controllers 112 in electrical connection with a midplane 116. The shelf 114 is supported, in turn, within a cabinet (not shown). A pair of multiple drive assemblies (MDAs) 118 are receivingly engageable in the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
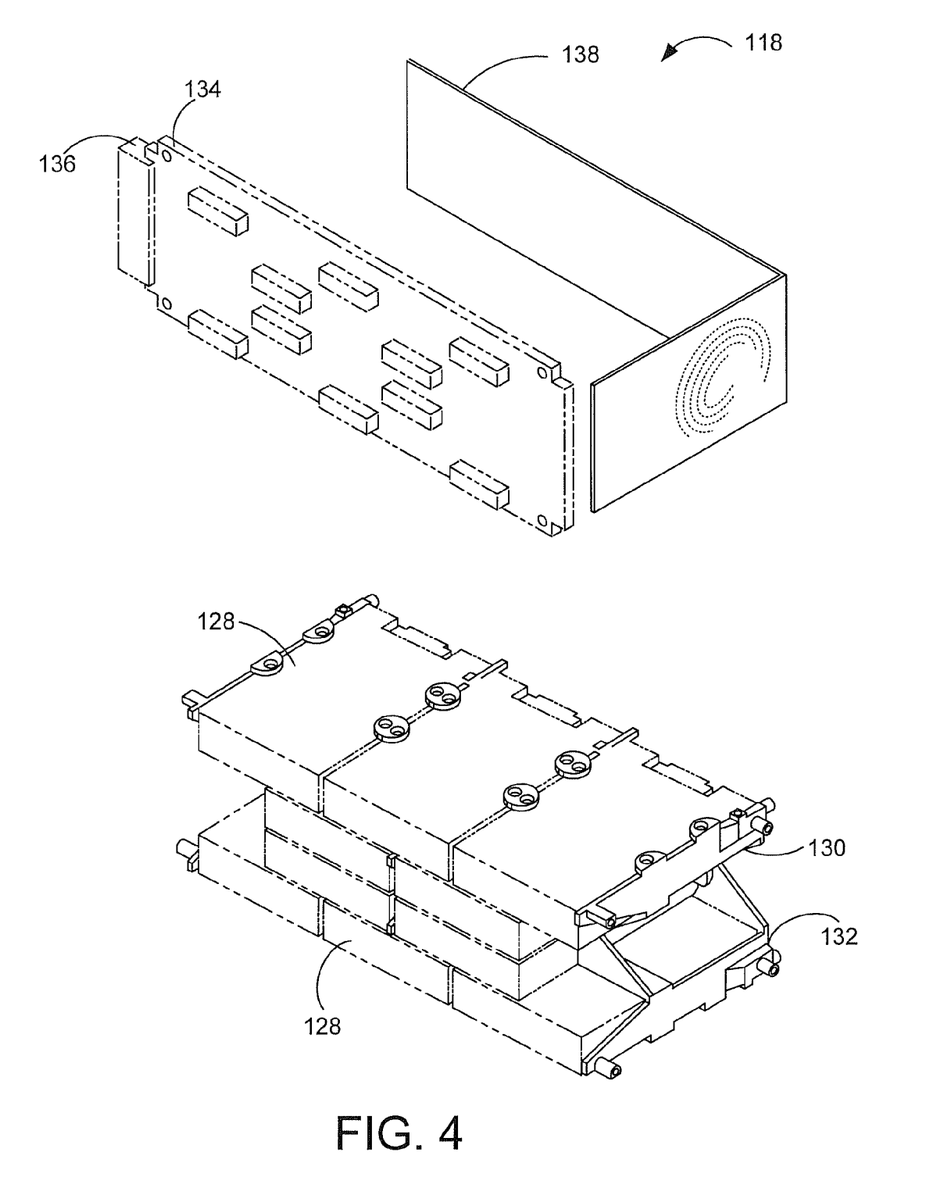
FIG. 4 is an exploded isometric view of a multiple drive array of the intelligent storage element of FIG. 3.

FIG. 4 is an enlarged exploded isometric view of the MDA 118 which has an Lipper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of U.S. Pat. No. 7,133,291 entitled Carrier Device and Method for a Multiple Disc Array which is assigned to the assignee of the present invention and incorporated herein by reference. Another illustrative embodiment of the MDA 118 is the subject matter of U.S. Pat. No. 7,177, 145 of the same title which is also assigned to the assignee of the present invention and incorporated herein by reference. In alternative equivalent embodiments the MDA 118 can be provided within a sealed enclosure.

Figure 5:
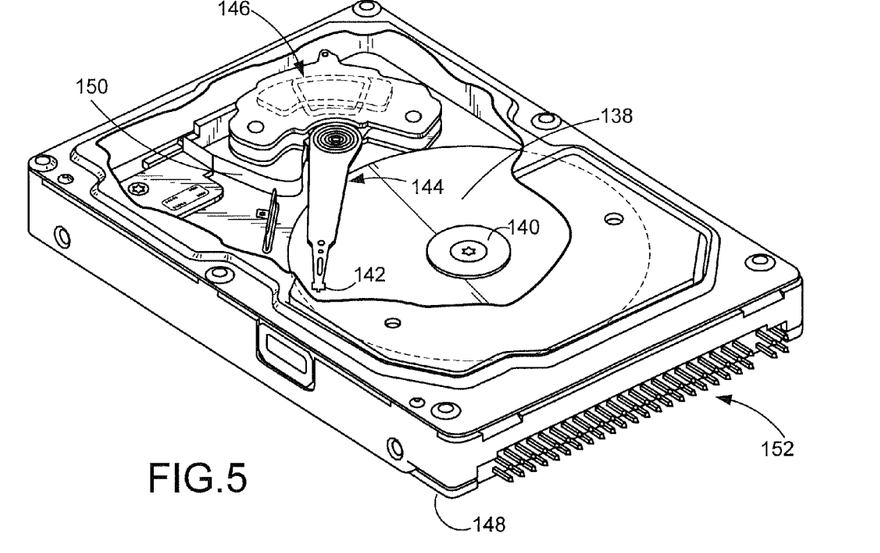
FIG. 5 is an exemplary data storage device used in the multiple drive array of FIG. 4.

FIG. 5 is an isometric view of the data storage device 128 suited for use with embodiments of the present invention and in the form of a rotating media disc drive. Although a rotating spindle with moving data storage medium is used for discussion purposes below, in alternative equivalent embodiments a non-rotating medium device, such as a solid state memory device is used. In the illustrative embodiments of FIG. 5 a data storage disc 138 is rotated by a motor 140 to present data storage locations of the disc 138 to a read/write head ("head") 142. The head 142 is supported at the distal end of a rotary actuator 144 that is responsive to a voice coil motor (VCM) 146 in moving the head 142 radially between inner and outer tracks of the disc 138. The head 142 is electrically connected to a circuit board 148 by way of a flex circuit 150. The circuit board 148 is adapted to receive and send control signals controlling the functions of the data storage device 128. A connector 152 is electrically connected to the circuit board 148, and is adapted for connecting the data storage device 128 with the circuit board 134 (FIG. 4) of the MDA 118.

Figure 6:
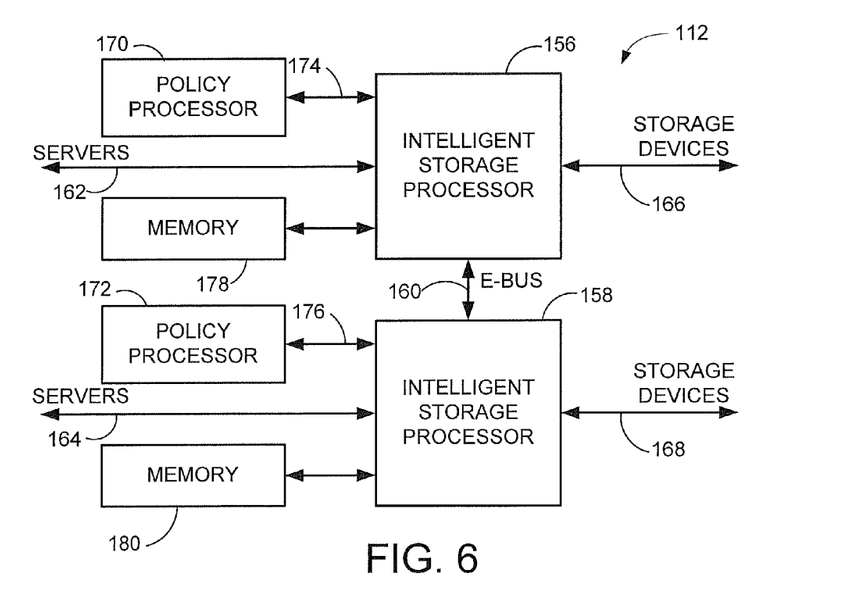
FIG. 6 is a functional block diagram of the array controller in the intelligent storage element.

FIG. 6 depicts the controller 112 (FIG. 2) architecture as having two intelligent storage processors (ISPs) 156, 158 coupled by an intermediate bus 160 (referred to as an "ebus"). Each of the ISPs 156, 158 is preferably disposed in a separate application specific integrated circuit (ASIC) package on a common controller board. Preferably, the ISPs 156, 158 each respectively communicate with upstream application servers via fibre channel server links 162, 164, and with storage devices making up the storage capacity 109 via fibre channel storage links 166, 168.

Policy processors 170, 172 execute a real-time operating system for the controller 112 and communicate with the respective ISP 156, 158 via peripheral device bus 174, 176. The policy processors 170, 172 can further execute customized logic to perform sophisticated processing tasks in conjunction with the ISPs 156, 158 for a given storage application. The ISPs 156, 158 and the policy processors 170, 172 access memory modules 178, 180 as required during operation.

Figure 7A:
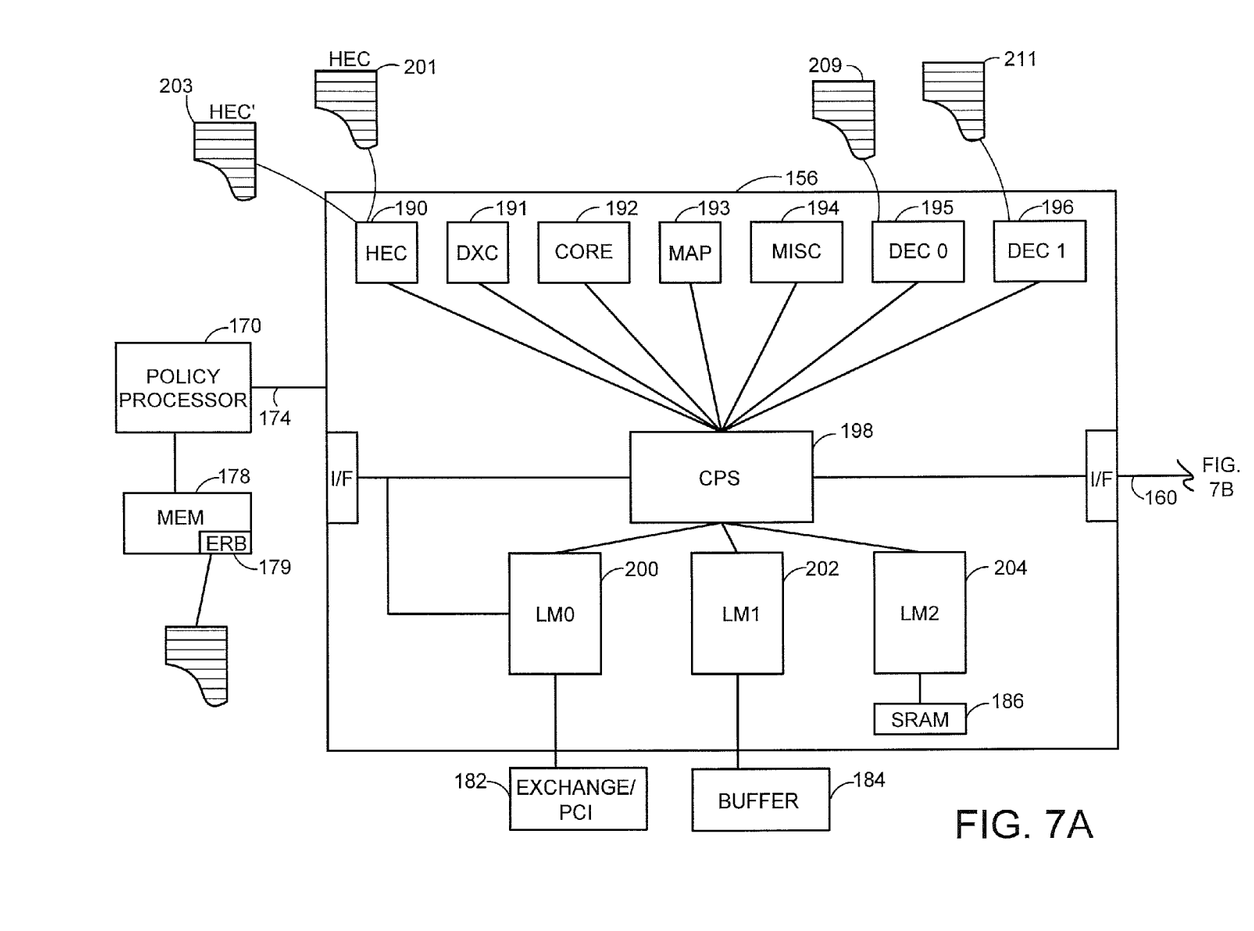
FIGS. 7A and 7B depict a more detailed functional block diagram of the array controller of FIG. 6.
Figure 7B:
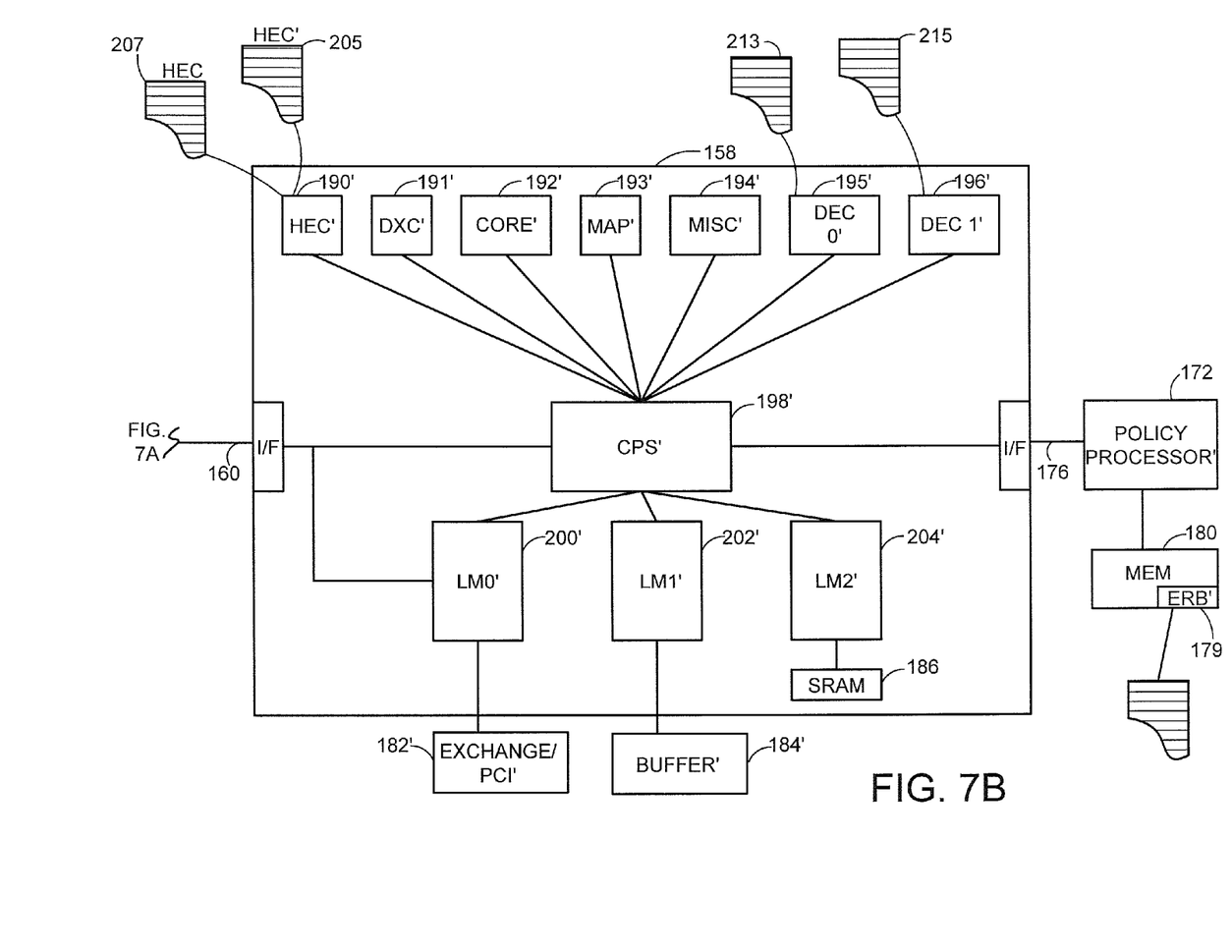

FIGS. 7A and 7B depict details of the ISPs 156, 158 in accordance with illustrative embodiments of the present invention. Each ISP 156, 158 unit masters, or in other words provides the locus of control for, a predetermined pool of data storage devices 128. Therefore, the like components of each ISP 156, 158 are designated with like numerals but differentiated by primes on the ISP 158.

Each ISP 156, 158 is coupled to an exchange/PCI memory module 182, 182', a buffer memory module 184, 184', and an SRAM module 186, 186'. Each policy processor 170, 172 accesses both the functionality of the respective ISP 156, 158 as well as data stored in the memory modules 182-186, 182'- 186' via the peripheral device bus 174, 176.

In the embodiments of FIGS. 7A and 7B each ISP 156, 158 has seven dedicated purpose function controllers (FCs) 190- 196, 190'-196'. A host exchange controller (HEC) 190 communicates with the front end fibre channel server link 162 (FIG. 6), and a HEC 190' communicates with the front end fibre channel server link 164 (FIG. 6). Two disc exchange controllers (DEC0, DEC1) 195, 196 communicate with the back end fibre channel storage link 166 (FIG. 6), and DEC0, DEC1 195', 196' communicate with back end fibre channel storage link 168 (FIG. 6). The other dedicated purpose FCs are a DMA/XOR controller (DXC) 191, 191', a command routing controller (CORE) 192, 192', a metadata controller (MAP) 193, 193', and a miscellaneous function controller (MISC) 194, 194'.

The FCs 190-196, 190'-196' can access the memories 182- 186, 182'-186' via an interconnect, such as a cross point switch (CPS) 198, 198' and corresponding list managers (LMs) 200-204, 200'-204'. Like the FCs, the LMs are hardware-intensive dedicated purpose processing elements. Each LM is optimized for use with specified data structure operations, with each LM maintaining its list of data structure responsibilities. That is, each data structure in the system is uniquely owned by only one of the LMs.

In the following, an I/O command received by HEC 190 directed to a LUN1 contained within a pool mastered by ISP 156 is referred to as a local data transaction for policy processor 170. However, an I/O command received by HEC 190' directed to LUN1 is referred to as a remote data transaction for policy processor 170. Likewise, an I/O command received by HEC 190' directed to a LUN2 contained within a pool mastered by ISP 158 is referred to as a local data transaction for policy processor 172. However, an I/O command received by HEC 190 directed to LUN2 is referred to as a remote data transaction for policy processor 172.

An event ring buffer (ERB) 179, 179' contains pending transaction requests that are collectively posted in real time from each of the plurality of FCs 190-196, 190'-196' directed to the respective policy processors 170, 172. Generally, the ERB 179, 179' is a FIFO buffer, such as a circular buffer, that synchronizes all the transactions for both ISPs 156, 158 that are directed to a given policy processor 170, 172. As described above, those transactions posted to the ERB 179, 179' include all transaction requests, both local and remote, from each of the FCs 190-196, 190'-196' that are directed to the respective policy processors 170, 172. Those transactions posted to the ERB 179, 179' also include transaction responses, both local and remote, from each of the LMs 200-204, 200'-204' that are directed to the respective policy processors 170, 172. Those transactions posted to the ERB 179, 179' also include transactions from one of the policy processors 170, 172 to the other of the policy processors 170, 172.

The ERB 179, 179' efficiently and reliably handles the large number of real time transactions that constitute the bulk of all work performed in a real time system. The ERB 179, 179' causes all sources of transactions to post them to a single synchronizing ring so that the sequence of transactions from any one source is ordered by occurrence in time. Furthermore, transactions generated by one source as the result of activity from another source can be sequential, if desired, with regard to transactions from the first source and derivative transactions from the second source. Transactions from different sources that are independent can be posted in any order but will be "close on the ring" if "close in time."

As discussed, in the dual active-active controller mode one policy processor 170, 172 can post transactions to the other policy processor's ERB 179, 179'. This "one ring" mechanism allows the bulk of all processing done by a policy processor 170, 172 to be managed with extremely low overhead. The fact that all the transactions are processed in the order of arrival eliminates most of the complexities associated with managing a real time system. Using a data structure that describes each transaction from a plurality of processing elements in "one ring to rule them all" prevents misinterpretation of the transactions and their relative order, while relatively reducing code complexity.

A Sloppy Quota Accounting Method (SQAM) based on credits combined with the ability to have each policy processor 170, 172 manage a separate ERB 179, 179' can prevent overflowing the ERB 179, 179'. A highly efficient hardware architecture such as that provided by the PowerPC 440GX ASIC permits extremely low overhead in the posting of transactions. An environment with practically zero device reads in the critical path can be constructed on the ERB 179, 179' with these efficient hardware assists. In fact, it is possible to construct a simple polling RTOS where interrupts occur only for infrequent non-routine transactions on the ERB 179, 179'. Because interrupt processing to queue transactions to thread level and the attendant movement of data can typically represent many times the actual processing overhead for the transaction, a polling RTOS based on the ERB 179, 179' can be many times more efficient than one based on interrupts. Efficiency gains are realized not only in the dimension of CPU time but also in the dimension of memory resources required.

In order to prevent overflowing the ERB 179, 179', simplify logic, and enable the necessary atomic store of event data, it is also preferable to fix the size of each transaction data entry.

Ancillary data associated with a particular transaction can be stored in a data ring buffer (DRB) that is managed independently by the source of the transaction. For example, FIGS. 7A and 7B depict HEC 190 managing two DRBs 201, 203 containing ancillary data associated with posted transactions on the ERBs 179, 179', respectively. Similarly, HEC 190' manages DRBs 205, 207 containing ancillary data associated with posted transactions on the ERBs 179', 179, respectively. DEC0 195 and DEC1 196 manage DRBs 209, 211 ancillary to the ERB 179, and likewise DEC0 195' and DEC1 196' manage DRBs 213, 215 ancillary to the ERB 179'.

Each ERB and DRB is large enough to accommodate data generated for all outstanding transactions plus a quota of data and transactions associated with unsolicited fibre channel data. Each FC 190-196, 190'-196' can have a separate quota for the following four particular classes of unsolicited fibre channel data and transaction:

| | |
|---|---|
| FCP_CMD | (New Target SCSI Commands) |
| ELS Packets | (Extended Link Services Commands) |
| BLS Packets | (Basic Link Services Commands) |
| FCP_DATA/ Other | (Unexpected Data Frames - 32 Bytes Data Retained)/ (Frame Header Plus 32 Bytes - Other Discarded) |

The amount of data in a frame for the above four classes can vary. The SQAM can be used to avoid overflowing either the ERB or a particular DRB. For the "FCP_DATA/Other" class, the 32 bytes of data beyond the header are all that should be passed on. For a FCP_CMD frame, a maximum 64 bytes of data beyond the header can be passed on via the DRB. The transaction plus the first two DRB entries consume a single combined "count." Every additional 64 bytes or part therefore for the last part should consume another "count." This rule also applies to frames in the "ELS Packets" class. No "BLS Packet" should have more than an additional 32 bytes beyond the header so this class requires no unusual handling.

The policy processor 170, 172 will manage not making requests for which there is insufficient room to store the transaction or associated data via the SQAM. As unsolicited transactions and associated data are consumed, the policy processor 170, 172 will adjust its quota counts, including "renew" counts. When a count falls below a specified threshold, the policy processor 170, 172 will generate a request to renew all quotas. When fibre channel unsolicited data is received and the quota is insufficient, the FC bumps a count based on the class and discards the data. These counts are reported and zeroed when an update quotas request is processed. At FC initialization, all quotas will default to zero. The policy processor 170, 172 will issue an update quotas request to set the initial quota values just after the FCs have started executing.

Each transaction entry in the ERB contains an event code identifying the type of transaction in play. The event codes are logically grouped to simplify processing, in that the type of event dictates how the rest of the data is interpreted. The transaction entry also includes data indicating whether the transaction was generated locally or remotely, in order to control where to find any ancillary data in DRBs. An illustrative ERB can have the following format:

| | |
|---|---|
| 0 | Event Code |
| 1 | Frame Size (Bytes) |
| 2 | DRB Byte Count |

-continued

| | |
|---|---|
| 3 | DRB ID [15:14] | DRB Index [13:0] |
| 4 | R_CTL | DID [23:16] |
| 5 | D_ID [15:0] |
| 6 | CS_CTL | SID [23:16] |
| 7 | S_ID [15:0] |
| 8 | TYPE | F_CTL [23:16] |
| 9 | F_CTL [15:0] |
| 10 | SEQ_ID | DF_CTL |
| 11 | SEQ_CNT |
| 12 | OXID |
| 13 | RXID |
| 14 | Parameter [31:16] |
| 15 | Parameter [15:0] |

The "Event Code" field indicates which class of transaction was received:

| | |
|---|---|
| 0 | ISP Response |
| 1 | New SCSI Command |
| 2 | BLS Frame |
| 3 | ELS Frame |
| 4 | Unexpected Frame |
| 5 | SBL Data 0 |
| 6 | SBL Data 1 |
| 7 | BLS Response |
| 8 | ELS Response |
| 9 | ETF I/O Request |
| 10 | Partner Assist |
| 11 | MAP Response |
| 12 | Buffer Scan Stopped |

The "DRB ID" field is used to indicate from which FC the ERB transaction was sent so that the policy processor 170, 172 knows which DRB to look at to find the additional data, if any. For some BLS frames there won't be any additional data. Note that the above format minus the fields describing the DRB data is used for solicited ELS and BLS response frames. Those frames will be stored in the "ELS Response Table" (ERT). The "DRB ID" field is decoded as follows:

| | |
|---|---|
| 0 | HEC |
| 1 | HEC' |
| 2 | DEC0 |
| 3 | DEC1 |
| 4 | Not Used |

Figure 8:
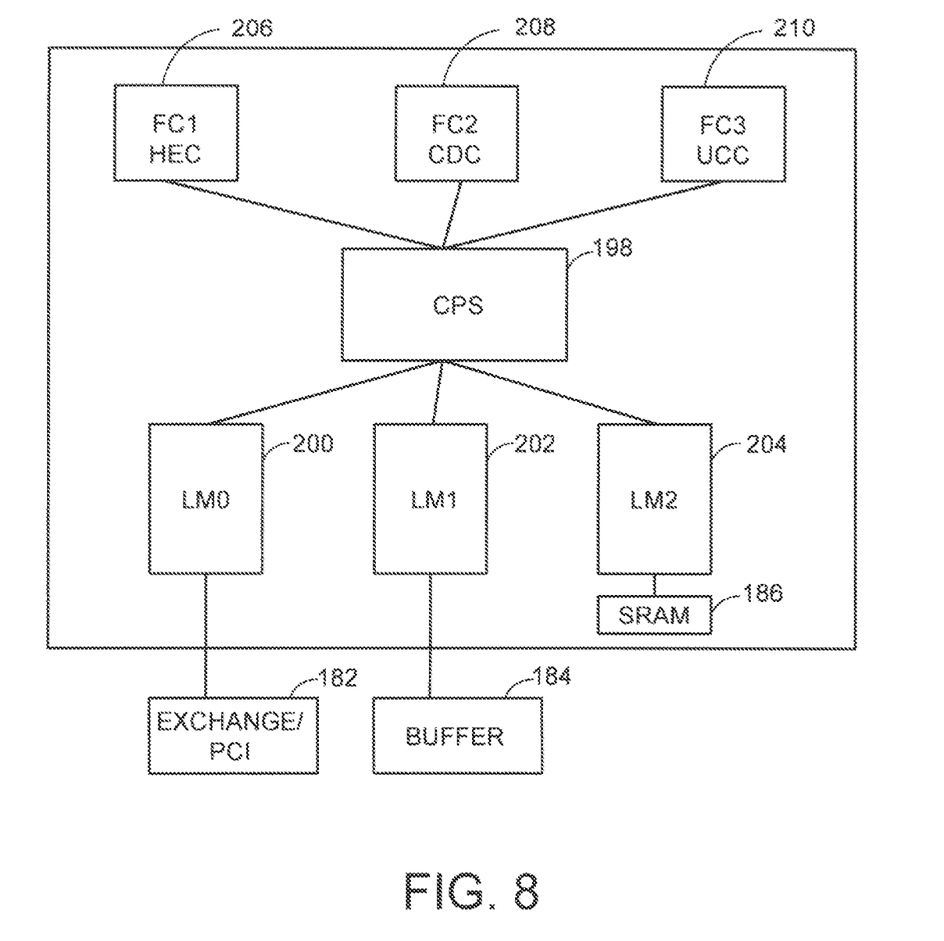
FIG. 8 is a functional block diagram of an array controller constructed in accordance with related art solutions.

It would be possible to perform storage transactions associated with a network I/O command entirely within the framework of the ISP 156 FCs and LMs, but the critical path of such transactions quickly becomes a long and relatively inefficient series of sub-transactions between the FCs and the LMs. For example, FIG. 8 depicts an ISP constructed in accordance with related art solutions having FCs programmed to perform the dedicated tasks of a HEC 206, a command decode function (CDC) 208, and a cache logic controller (UCC) 210. The following steps describe the critical path for performing a cache read with this controller architecture.

In step one, HEC 206 receives a read cache command from a requester via the server fibre channel link.

In step two, HEC 206 translates the transaction request and sends a corresponding request packet for a data transaction via the CPS 198 to LM0 200.

In step three, LM0 200 links the data transaction to the tail of an input queue of the CDC 208.

In step four, CDC 208 fetches the transaction from its input queue and decodes the data transaction into its respective compute and data structure operations.

In step five, CDC 208 generates a request packet to LM1 to have the data transaction moved to the UCC 210.

In step six, LM1 links the data transaction to the tail of an input queue of the UCC 210.

In step seven, UCC 210 generates one or more request packets for cache data structure operations to LM2.

In step 8, LM2 retrieves the requested data structures.

In step 9, LM2 generates a response packet that the requested data is ready for transfer.

In comparison, the embodiments of the present invention offload memory-intensive and compute-intensive functions such as the cache node lookup to the policy processor 170. That is, the storage system of the claimed embodiments performs storage transactions associated with network I/O commands with the ISP 156 interconnect 198 selectively coupling the plurality of FCs 190-196 to the policy processor 170 via LM0 200 communicating on the peripheral device bus 188 to which the policy processor 170 is connected. By way of this architecture the external processor interface (EPIF) of the ISP 156 provides the policy processor 170 with access via the peripheral device bus 188 to data structures stored in the exchange memory 182. As described below, the data structures are aligned with virtual stripe boundaries of the data storage capacity and describe corresponding data buffers in cache memory.

This "policy processor partnering" architecture increases the processing power of the controller 112 by reducing the number of sub-transactions involved. For example, the critical path for a cache read is considerably shorter for the controller 112 of FIGS. 7A and 7B and the present embodiments, as compared to the controller of FIG. 8 discussed above.

Step one is the same, HEC 190 receives a read cache command from a requester via the server fibre channel link.

Step two is also the same, HEC 190 translates the transaction request and sends a corresponding request packet for a data transaction via the CPS 198 to LM0 200.

However, in step three LM0 200 posts the data of the transaction directly to the policy processor 170 which decodes the data transaction, validates data in cache, and performs a cache lookup.

Figure 9:
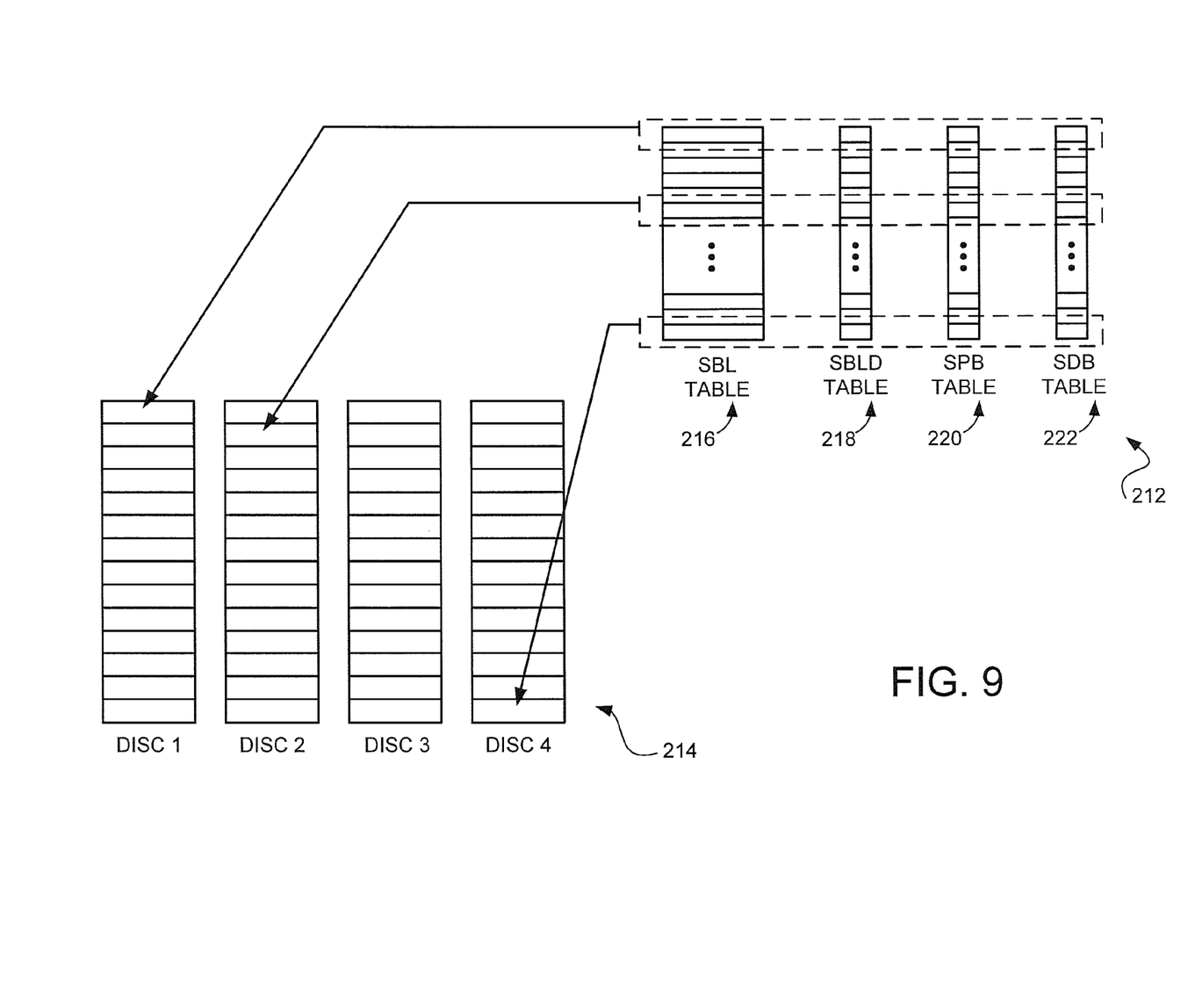
FIG. 9 diagrammatically depicts SBL, SBLD, SPB and SDB metadata.

FIG. 9 illustrates exemplary metadata structures 212 that are used by the policy processor 170 to manage the striped storage discs 214. A stripe buffer list (SBL) table 216 includes a plurality of SBLs that are aligned with virtual stripes on a storage medium, and include one or more buffer indices referencing corresponding data buffer addresses in the cache memory. The policy processor 170 executes programming instructions stored in memory to index the SBL table according to the VBA and pool associated with the storage transaction, thereby associating the storage transaction with a stripe in the storage capacity 109.

The policy processor 170 manages the cache on a node basis using a stripe buffer list descriptor (SBLD) in a corresponding table 218. Each SBLD holds data that describes the RAID stripe, namely the starting virtual block address (VBA) and the logical disk ID, and some non-volatile state of the stripe with which it is associated. Each SBLD conforms with a data structure in policy processor memory, the stripe data descriptor (SDD), which holds data concerning recent and current accesses. Both the SBLD and SDD conform to a particular stripe buffer list (SBL).

Each cache node managed by the policy processor 170 preferably references some particular SDD, with active SDD structures for a given set of logical discs being preferably linked in ascending order via a virtual block address (VBA) using forward and backward linked lists. Preferably, the VBA values are aligned with the RAID data organization using a grid system sometimes referred to as a RAID Allocation Grid System (RAGS). Generally, any particular collection of blocks belonging to the same RAID stripe (e.g., all of the data contributing to a particular parity set) will be assigned to a particular reliable storage unit (RSU) on a particular sheet. A book consists of a number of sheets and is constructed from multiple contiguous sets of blocks from different storage devices. Each SDD preferably includes variables that indicate various states of the data, including access history, locked status, last offset, last block, timestamp data (time of day, TOD), identifiers to which zone (book) the data belong, and RAID level employed.

A stripe buffer list present bits (SPB) table 220 and a stripe buffer list dirty bits (SDB) table 222 enable the policy processor 170 to manage the data buffers in the cache memory. The SPB table 220 includes a bit for each sector of each SBL to indicate whether the cached data for a given sector is or is about to be valid (i.e., has current data for the corresponding sector). It also indicates that the buffer index is valid. In subsequent exchange requesting a read operation to the same sector, if the SPB table 220 indicates that the data is valid, then the request can be serviced from the buffer memory instead of requiring a round trip to the storage medium. The SDB table 222 includes a bit for each sector of the SBL to indicate whether the cached data for a given sector is "dirty" (i.e., needs to be written from the data buffer). For example, if the storage controller loses power in the middle of an exchange, the SDB table 222 can be used to indicate that the data in the cache needs to be flushed to the appropriate target. Therefore, when the storage controller reboots, data integrity is maintained in the presence of a catastrophic event.

After the cache lookup is completed, the policy processor 170 allocates memory for and populates an active context entry (ACE) for carrying out the data transaction. If the data transaction is directed to the HEC 190 in the host exchange range, such as in the case of a cache hit, then the context takes the form of a front active context entry (FACE). Ali exemplary format for a FACE for a SCSI target I/O assist is as follows:

| | | |
|---|---|---|
| 0 | Flags | |
| 1 | Script/Stage | |
| 2 | SBL Index | [or Buffer Index] |
| 3 | Blocks/Offset | [or Byte Count] |
| 4 | Status | |
| 5 | CORE Tag Link | |
| 6 | Destination ID High | |
| 7 | Destination ID Low | |
| 8 | Real SBL Index | [or Response Frame Length] |
| 9 | Real Additional SBL Index | [or HSR Index] |
| 10 | VBA High | [31:16] |
| 11 | VBA Low | [15:0] |
| 12 | Relative Offset | [Sectors] |
| 13 | OXID | |
| 14 | Check Tag | |
| 15 | Additional SBL Index | |

The "Flags" value is defined as follows:

| | | |
|---|---|---|
| 0x8000 | Inactive | [0 => ACE Active] |
| 0x4000 | Remote | [1 => Remote Execution] |
| 0x2000 | Sector Size | [0 = 512, 1 = 520] |
| 0x0C00 | Burst Length | [(x + 1) * Sector Size] |
| 0x0200 | Send Good Status | [1=> Send SCSI Good] |

-continued

| | | |
|---|---|---|
| 0x0100 | Aborted | [1 => Aborted] |
| 0x0080 | Previous Dirty | [1 => Atomic Write Dirty] |
| 0x0040 | Mirror Data | [1 => Also Mirror Data] |
| 0x0020 | Non-Sector Data | [1 => Not Sector Data] |
| 0x0010 | Remote Data | [1 => Data on Other Nacelle] |
| 0x0008 | Target | [1 => Target] + Command Queue: |
| 0x0006 | Command Queue | 0 DEC 0 New Command |
| | | 1 DEC 1 New Command |
| | | 2 HEC New Command |
| | | 4 HEC Inbound |
| | | 5 HEC Outbound |
| | | 6 HEC New Command |
| 0x0001 | Use Mirror | [1 => Data in THIS Mirror] |

The "Non-Sector Data" flag signals that a SCSI non-sector data command is being processed. The location to get or put data is defined by the "Buffer Index" field. The amount of data to transfer is found in the "Byte Count" field. The "Aborted" flag indicates the request has been aborted prior to arriving. The status should be set appropriately and the FACE returned to the CORE 192 after incrementing the "Stage" field. The "Mirror Data" flag requests that the data also be mirrored across the ebus 160. It can apply to non-sector data as well as normal sector data. The "Burst Length" field defines the number of sectors that should be used to fill a fiber channel frame. The frame size is computed as the "Sector Size"*("Burst Length"+1) plus 32 for the header. For example, if "Sector Size" is 1 (520) and "Burst Length" is 3, then the frame size is 520*4+32=2112.

The "Remote Data" flag indicates that the buffer memory to be accessed is across the ebus 160 from the other ISP 158. When the "Remote" flag is also set, the HEC 190 should invert the "sense" of the "Use Mirror" flag to determine which buffer and SBL pool to access.

Returning to the FACE format, the "Script" value selects one of several predefined scripts of a sequence of steps, which when completed, result in corresponding "cases." The "Stage" value indicates which step is to be executed. This architecture increases processing performance in that for a given request, multiple stages can be completed by the ISP 156 before completion is responded to the policy processor 170.

The "Blocks" field defines the transfer size in sectors, with 0 meaning 256. The "Offset" field defines the starting offset within the "disk stripe." It is the starting sector offset in the SBL and the low-order byte of the starting LBA. When the transfer size is 0, it implies a transfer size of 256. The HEC uses the "Destination ID" field to fill in context or build FCP_HDR data. For target writes, in the case where a write of the maximum atomic write size (128 KB) crosses a "disk stripe" (SBL) boundary, the "Additional SBL Index" references the second SBL. This case is detected by the fact that the "Offset" plus the "Blocks" value is greater than 256. The "Real SBL Index" and "Real Additional SBL Index" are only used for the special case of "atomic write" involving a write where some or all of the sectors are already "dirty" in the cache. The "Relative Offset" field defines the number of sectors preceding this portion of a SCSI target assist.

The "Status" field is used to convey particulars about errors detected with regard to target I/O requests. The values for "Status" are as follows:

| | | |
|---|---|---|
| 0 | Completed - Success | [Success] |
| 1 | Completed - SCSI Error | |

-continued

| | | |
|---|---|---|
| 2 | Programming Error | |
| 3 | Could Not Open ALPA | |
| 4 | Aborted - Partner | |
| 5 | DIF Bad Tag Detected | |
| 6 | DIF Bad EDC Detected | |
| 7 | Rejected - Pool Access Prohibited | |
| 8 | Dropped Frame Detected | |
| 9 | Aborted - ABTS | |
| 10 | Compare Error | |
| 11 | DIF Summary OK | |
| 12 | DIF Summary Error | |
| 13 | Remote Programming Error | |

Contrarily, if the data transaction is directed to DEC0 or DEC1 in the pool exchange range, such as in the case of a cache miss, then the context takes the form of a pool active context entry (PACE). An exemplary format for a PACE in a SCSI read, verify, write, or write verify command is as follows:

| | | |
|---|---|---|
| 0 | Flags | |
| 1 | Script \| Stage | |
| 2 | SBL Index | |
| 3 | Blocks \| Offset | |
| 4 | Status | |
| 5 | CORE Tag Link | |
| 6 | [HEC: LUN \| DID High] | |
| 7 | [HEC: DID Low] | {Response Byte Count} |
| 8 | Extended LUN \| PCI Cache Line High | [12:8] \| [26:16] |
| 9 | PCI Cache Line Low | [15:0] |
| 10 | VBA High | [31:16] |
| 11 | VBA Low | [15:0] |
| 12 | LBA High | [31:16] |
| 13 | LBA Low | [15:0] |
| 14 | Check Tag | |
| 15 | Substitute Tag | |

The "Flags field is defined as follows:

| | | |
|---|---|---|
| 0x8000 | Inactive | [0 => ACE Active] |
| 0x4000 | Remote | [1 => Remote Execution] |
| 0x0800 | Skip Dirty | [1 => Discard When Block Dirty] |
| 0x0400 | Substitute Tag | [1 => Set Substitute Tag Flag] |
| 0x0200 | Verify | [1 => Write Verify OR Verify With Data] |
| 0x0100 | Aborted | [1 => Aborted] |
| 0x0080 | Write | [0 => Read] |
| 0x0040 | Mirror Data | [Does Not Apply] |
| 0x0030 | I/O Type | [0 => Read/Write Command] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [1 => Data in THIS Mirror] |

The "Substitute Tag" flag causes special behavior with regard to manipulation of the DIF data. This can occur for both read and write operations. If the "Check Tag" field is not the value 0xFFFF or 0xFFFE, the "incoming" tags ("META Tag" and "REFERENCE Tag") should be checked against the expected tags ("Check Tag" and "VBA") but the "Substitute Tag" should be substituted. Because of the hardware requirements, the "VBA" will also be substituted and a correct CRC will replace the current CRC. That is, an entirely new DIF field will be generated and substituted. If the "Check Tag" field has a value of 0xFFFF, there will be incoming DIF data and the CRC, of course, must be assumed to be correct. However, the "REFERENCE Tag" (VBA) and "META Tag" values should be ignored. That is, no "tag" errors should be generated. If the "Check Tag" field has a value of 0xFFFE, tag and CRC errors should be ignored.

When a status other than "SCSI Good" is received, the first 256 bytes or less of the FCP_RSP frame will be stored in the "ELS Response Table" (ERT). The "Response Byte Count" will reflect the actual number of bytes in the FCP_RSP frame. It is not to be updated unless a status other than "SCSI Good" with no special flags set is received.

The SCSI "Long Transfer" command request is used to issue "standard" SCSI commands where the transfer crosses a "RAID stripe" boundary and exceeds 256 sectors in length. The format of a PACE for this operation is as follows:

| | | |
|---|---|---|
| 0 | Flags | |
| 1 | Script \| Stage | |
| 2 | SBL Index | |
| 3 | Blocks | |
| 4 | Status | |
| 5 | CORE Tag Link | |
| 6 | [HEC: LUN \| DID High] | |
| 7 | [HEC: DID Low] | {Response Byte Count} |
| 8 | Extended LUN \| PCI Cache Line High | [12:8] \| [26:16] |
| 9 | PCI Cache Line Low | [15:0] |
| 10 | VBA High | [31:16] |
| 11 | VBA Low | [15:0] |
| 12 | LBA High | [31:16] |
| 13 | LBA Low | [15:0] |
| 14 | Check Tag | |
| 15 | Substitute Tag | |

The field definitions are essentially the same as for the "standard" SCSI commands described above. The "Blocks" field will always be greater than "256". The controller 112 will build the SCSI CDB as usual based on the desired number of blocks to be written, which will be taken from the entire contents of word 3. Aside from this, processing for this type differs from processing for the type 0 "normal" SCSI command only in the handling of the data transfer part. The logic must detect instances where the end of an SBL is encountered. It must then fetch both a new "SBL Index" and a new "VBA Low" value from the ACE correlated data (ACD) based on the offset that the transfer has reached. The logic shall assume that the initial offset into the SBL is "0." The initial and subsequent "VBA Low" values shall have a low byte value of "0." The maximum transfer supported shall be 2 MB (4096 sectors).

The usage of the "Flags" field for the "Long Transfer" variant is as follows:

| | | |
|---|---|---|
| 0x8000 | Inactive | [0 => ACE Active] |
| 0x4000 | Remote | [1 => Remote Execution] |
| 0x0800 | Skip Dirty | [1 => Discard When Block Dirty] |
| 0x0400 | Substitute Tag | [1 => Set Substitute Tag Flag] |
| 0x0200 | Verify | [1 => Write Verify OR Verify With Data] |
| 0x0100 | Aborted | [1 => Aborted] |
| 0x0080 | Write | [0 => Read] |
| 0x0040 | Mirror Data | [Does Not Apply] |
| 0x0030 | I/O Type | [1 => Long Transfer] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [1 => Data in THIS Mirror] |

Support is required for a number of SCSI commands that either have no data or use non-sector data. For example, the SCSI "Test Unit Ready" command has no data. The SCSI "Verify" command when so specified will have no data. The SCSI "Mode Sense" expects data that is not related to sectors on the disk drive. The SCSI "Mode Select" command sends data that is not related to sectors on the disk drive. For SCSI commands with non-sector data, the amount of data will be defined by the "Byte Count" field. A "Byte Count" value of "0" is to be interpreted as 65536. The maximum outbound transfer shall be 16384. The "raw" DMA mode will be required to transfer the data to or from the ISP 156 ERB.

The format for a PACE for SCSI commands that don't involve sector data is as follows:

| | | |
|---|---|---|
| 0 | Flags | |
| 1 | Script | Stage | |
| 2 | Buffer Index | |
| 3 | Byte Count | |
| 4 | Status | |
| 5 | CORE Tag Link | |
| 6 | [HEC: LUN | DID High] | |
| 7 | [HEC: DID Low] | {Response Byte Count} |
| 8 | Extended LUN | PCI Cache Line High | [12:8] | [26:16] |
| 9 | PCI Cache Line Low | [15:0] |
| 10-15 | [Unused] | |

The "Buffer Index" field defines which buffer in Buffer Memory to use. It will reference a temporary buffer allocated by the CORE 192. The "PCI Cache High" (11 bits) and "PCI Cache Line Low" fields define the PCI address used by the DXC 191 to move the data to or from the buffer in BM 184. This address is computed as follows:

PCI Address =

("PCI Cache Line High" << 21) + ("PCI Cache Line Low" << 5);

The usage of the "Flags" field for these variants is as follows:

| | | |
|---|---|---|
| 0x8000 | Inactive | [0 => ACE Active] |
| 0x4000 | Remote | [1 => Remote Execution] |
| 0x0800 | Skip Dirty | [Does Not Apply] |
| 0x0400 | Substitute Tag | [Does Not Apply] |
| 0x0200 | Verify | [Does Not Apply] |
| 0x0100 | Aborted | [1 => Aborted] |
| 0x0080 | Write | [1 => Data Out] |
| 0x0040 | Mirror Data | [Does Not Apply] |
| 0x0030 | I/O Type | [2 => Non-Sector Data] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [Does Not Apply] |

The SCSI command without data case can be determined by the fact that the "Byte Count" field in the PACE will be zero. The "Write" flag determines the "Data Out" versus "Data In" case. The policy processor 170 will build the entire Fiber Channel FCP_CMND frame in the corresponding ACD. This frame will be 68 bytes and include the SOFix and EOF "words" as well as the place for the CRC-32 data "word."

For "Data In" cases, the target may legitimately return less data than was requested. In this case, the "Byte Count" field determines the maximum to be received. When less is received, the "Byte Count" field should be updated. It will eventually be returned to the policy processor. Also, the FCP_RSP frame will need to be checked to determine that the right amount of data was returned.

The SPOT is still derived from the CORE Tag as is the OXID which determines where to stash the IRC and which ISP 156 context area to use. The other major class for fibre channel service that needs to be supported is "Link Services." For outgoing frames, this service will invoke a "Single Frame Sequence" (SFS) mechanism. The format for the PACE for the SFS mechanism is:

| | | |
|---|---|---|
| 0 | Flags | |
| 1 | Script | Stage | |
| 2 | Data CORE Tag | |
| 3 | Byte Count | |
| 4 | Status | |
| 5 | CORE Tag Link | |
| 6-15 | Unused [20 Bytes] | |

If the "Data CORE Tag" field is non-zero, it defines a miscellaneous active context entry (MACE) index that references the second block of frame data in the ACD table. It will only be required for frames greater than 256 bytes. The first 256 bytes of the frame are stored in the ACD entry corresponding to the PACE. The frame contains the SOFix and a place for the CRC-32 data word as well as EOFx word. Note that the PACE does not have to lie in the normal PACE range. It could actually be a MACE. The FCC will not utilize the CORE Tag of the PACE itself to derive any useful information. The SFS mechanism will use one of the ISP 156 context areas in the range 0-3.

The usage of the "Flags" field for the SFS service is as follows:

| | | |
|---|---|---|
| 0x8000 | Inactive | [0 => ACE Active] |
| 0x4000 | Remote | [1 => Remote Execution] |
| 0x0400 | Substitute Tag | [Does Not Apply] |
| 0x0200 | Verify | [Does Not Apply] |
| 0x0100 | Aborted | [Does Not Apply] |
| 0x0080 | Write | [Does Not Apply] |
| 0x0040 | Mirror Data | [Does Not Apply] |
| 0x0030 | I/O Type | [3 => SFS Service] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [Does Not Apply] |

The aforedescribed structure for a dual ported active-active array controller enables a novel and highly efficient manner of processing I/O commands for all network ports in dual redundant operation. By "active-active" it is meant that network ports on both sides of the controller 112 are active with respect to processing I/O commands with respect to a given LUN. In related art solutions LUN access is asymmetric either in terms of active paths or in terms of performance. Testing has shown that in accordance with the present embodiments less than a 1% difference in processing performance can be realized between right side and wrong side I/O commands.

Due to cache coherency and SCSI requirements, one side of the controller 112, the unit master side, must process all SCSI commands for a given LUN. However, an I/O command received on a particular fibre channel port requires that the associated data and acknowledgement be communicated via that same port. An I/O command received on the ISP port that is not on the unit master side is termed a "wrong side" command, while an I/O command received on the ISP port that is on the unit master side is termed a "right side" command.

Figure 10:
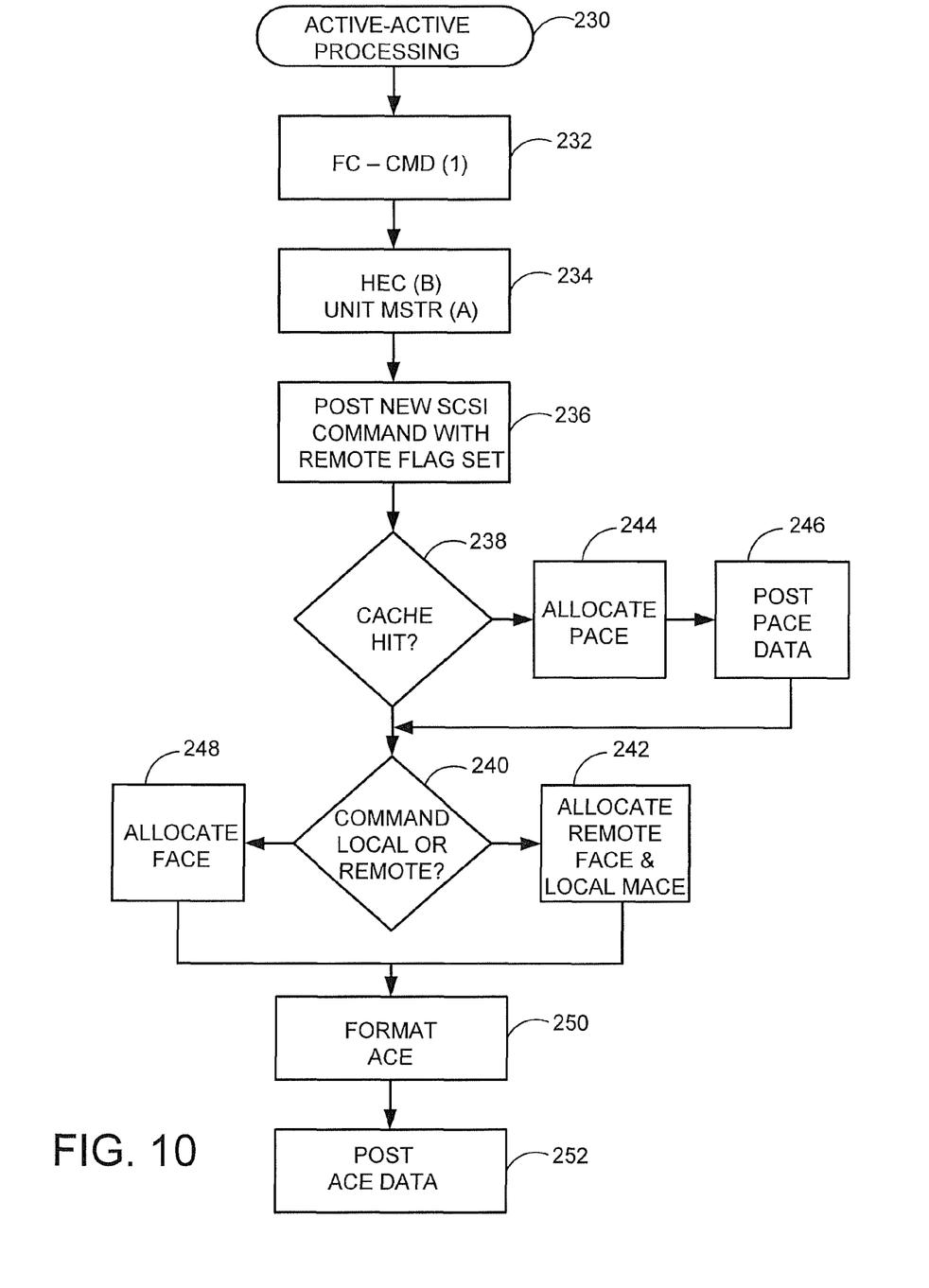
FIG. 10 is a flowchart depicting steps for practicing a method for ACTIVE-ACTIVE PROCESSING in accordance with embodiments of the present invention.

The present embodiments provide for remote execution of a wrong side I/O command on the unit master side, followed by local communication of the results of the execution to the network initiator. With reference to the architecture depicted in FIGS. 7A and 7B, FIG. 10 depicts steps in a method 230 for ACTIVE-ACTIVE PROCESSING in accordance with embodiments of the present invention. The method 230 begins in block 232 with the receipt of an I/O command by HEC 190' via the fibre channel link 164 to ISP 158. For purposes of illustration the fibre channel command is depicted as being directed to LUN1. In block 234 the HEC 190', executing in the ISP 158, correlates the Destination ID of the command frame to a LUN data table stored in memory. In this illustrative example HEC 190' is denoted as being on side B (ISP 158), while side A (ISP 156) is the unit master for LUN1. Thus, in this step HEC 190' determines that it has received a wrong side command.

In block 236 the HEC 190' posts a new SCSI command to the ERB 179 of policy processor 170, having as part of its header information a flag set to "remote." In block 238 the policy processor 238 performs a cache lookup, in the manner described above, to determine whether the command can be satisfied by a cache hit. If the determination of block 238 is yes, and because in this example the determination of block 240 is "remote," then control transfers to block 242. Note that had the determination of block 238 been no, then in block 244 the policy processor 170 allocates a PACE, and in block 246 it posts the PACE data to the appropriate CORE Tag. Control then returns to block 240.

For the remote command decision in block 242 the policy processor 170 allocates both a remote FACE and a local MACE. Contrarily, the local command decision in block 248 need only allocate a local FACE. In the event of the remote command, after all the local stages involving buffer allocation and management are completed, the data is transferred as part of the script to populate the remotely allocated FACE, and is then posted to the designated CORE Tag to communicate back to the initiator via the server link 164 connected to ISP 158.

It will be appreciated that although the illustrative example above dealt with a wrong side I/O command to ISP 158, a similar but reversed sequence will occur when a wrong side I/O command is sent to ISP 156. In that case, data is transferred across the ebus 160 with respect to the right side cache in ISP 158 under control of the HEC 190 posting a new SCSI command to the ERB 179' of policy processor 172 with the remote flag set. The transfer of control information for remote execution in either direction occurs automatically based on the remote flag in the original command and the Remote CORE Tag that defines what remote context area to use for remote execution. The remote flag in the original command also causes the particular FC on the remote ISP to transfer status and control back to the originating ISP. On the local ISP originating the remote request, the difference between a remote and local request amounts to setting the remote flag, setting the Remote Data flag, allocating a remote context, and storing its CORE Tag value in the request. After that, the two ISPs 156, 158 handle the transaction without additional intervention by the policy processors 170, 172. That is accomplished by designing well defined behavior for the subset of the stages in a script that are sequentially processed by the FCs, and how they are altered only slightly when the remote flag has been set.

Generally, as described, the claimed embodiments contemplate a storage system with a dual active-active array controller, and means for synchronizing right side and wrong side I/O commands together in real time on a unit master side of the controller. For purposes of this description and meaning of the appended claims the phrase "means for synchronizing" expressly includes the structure disclosed herein and equivalents thereof that collectively posts all transaction requests from the dedicated purpose FCs, both right side and wrong side, to the policy processor on the unit master side of the array controller.

The disclosed structure includes the first policy processor partnered with the first intelligent storage processor (ISP) having the first plurality of dedicated purpose FCs on one side, and the second policy processor partnered with the second ISP having the second plurality of dedicated purpose FCs on the other side, and the communication bus interconnecting the ISPs. The disclosed structure also includes programming instructions stored in memory and executed by the array controller to maintain the first policy processor in top level control of data transactions from both the first plurality of FCs and the second plurality of FCs that are associated with network I/O commands directed to a storage logical unit number (LUN) of which the first ISP is the logical unit master. The disclosed structure further includes the data structures disclosed herein. For purposes of this description and meaning of the appended claims "means for synchronizing" does not contemplate related attempted solutions wherein portions of the transactions are buffered separately or independently.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed:

1. A dual ported active-active array controller apparatus capable of processing input/output (I/O) commands from a remote host via a network to a storage space, the apparatus comprising:

a first policy processor partnered with a first intelligent storage processor (ISP), the first ISP having a first dedicated purpose host exchange controller (HEC) capable of communicating the I/O commands with the host via the network;

a second policy processor partnered with a second ISP, the second ISP having a second dedicated purpose HEC capable of communicating the I/O commands with the host via the network;

a communication bus interconnecting the ISPs; and programming instructions stored in memory and executed by the apparatus to buffer together transaction requests from both the first HEC and the second HEC corresponding to I/O commands directed to a first logical unit number (LUN) which the first ISP is a logical unit master of, to buffer together other transaction requests from both the first HEC and the second HEC corresponding to I/O commands directed to a second LUN which the second ISP is a logical unit mater of, to maintain the first policy processor in top level control of the buffered transaction requests corresponding to the first LUN and maintain the second policy processor in top level control of the buffered transaction requests corresponding to the second LUN to direct transaction request responses to the one of the first HEC and second HEC that originated the respective transaction request.

2. The apparatus of claim 1 wherein each of the first HEC and the second HEC communicates with the respective policy processor via a list manager (LM) and a peripheral device bus to which the respective policy processor is connected.

3. The apparatus of claim 1 wherein each HEC indexes a LUN table by a Destination ID command frame value to determine which ISP is the unit master of the LUN to which the I/O command is directed.

4. The apparatus of claim 1 wherein each of the first policy processor and the second policy processor comprises an event ring buffer (ERB) synchronizing the transaction requests from the first HEC and the second HEC.

5. The apparatus of claim 4 wherein the ERB comprises a transaction data entry identifying a location of a data ring buffer (DRB) controlled by one of the HECs that contains ancillary data corresponding to the respective transaction request.

6. The apparatus of claim 1 wherein each transaction request includes a flag indicating which HEC originated the transaction request.

7. The apparatus of claim 1 wherein each of the policy processors allocates a context for the transaction requests.

8. The apparatus of claim 7 wherein each of the policy processors formats a local context for a transaction request from a remote HEC.

9. A method comprising:
employing a dual active-active controller connected to a remote host via a network having a first policy processor partnered with a first ISP, the first ISP having a first (HEC), and a second policy processor partnered with a second ISP, the second ISP having a second HEC;
receiving an I/O command from the host by one of the HECs directed to a LUN on a non-unit-master side of the controller; and
in response to the receiving step, posting a transaction request from the HEC on the non-unit-master side of the controller to the policy processor on the unit-master side of the controller; and
after processing the transaction request under control of the policy processor on the unit-master side of the controller, directing a transaction request response to the HEC on the non-unit-master side of the controller that posted the transaction request and, in turn, communicating the transaction request response to the host via the HEC on the non-unit-master side of the controller.

10. The method of claim 9 wherein the employing step comprises the first HEC and the second HEC communicating with the respective policy processor via an LM and a peripheral device bus to which the respective policy processor is connected.

11. The method of claim 9 wherein the posting step comprises the HEC indexing a LUN table by a Destination ID command frame value from an I/O command.

12. The method of claim 9 where the posting step comprises the transaction request comprising a flag indicating which HEC originated the transaction request.

13. The method of claim 9 wherein the posting step comprises posting a plurality of the transaction requests to ERBs of each of the first policy processor and the second policy processor.

* * * * *